O. V. STEPHENS.
DIRIGIBLE HEADLIGHT FOR AUTOMOBILES.
APPLICATION FILED NOV. 26, 1915.
1,173,890.
Patented Feb. 29, 1916.
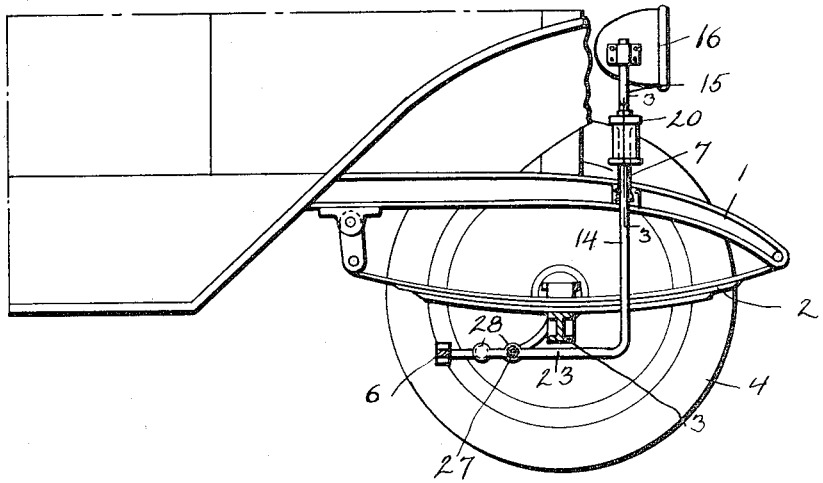
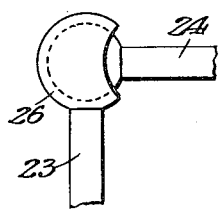
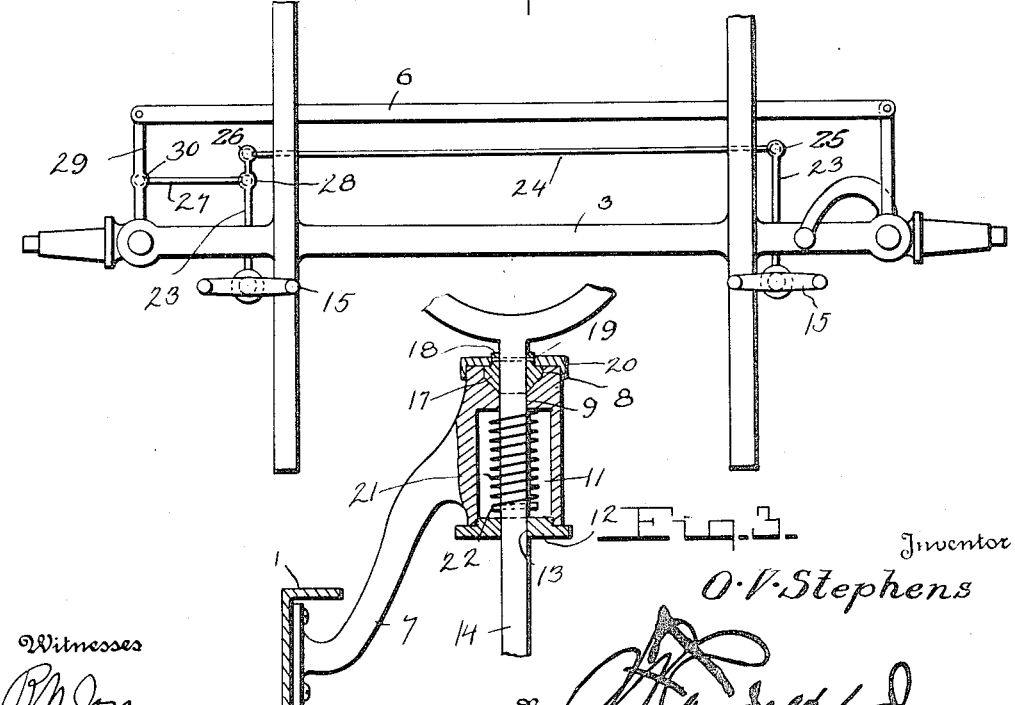
Inventor
O. V. Stephens

UNITED STATES PATENT OFFICE.

OTIS V. STEPHENS, OF RICHMOND, VIRGINIA, ASSIGNOR OF ONE-HALF TO R. W. HERBERT, OF RICHMOND, VIRGINIA.

DIRIGIBLE HEADLIGHT FOR AUTOMOBILES.

1,173,890. Specification of Letters Patent. Patented Feb. 29, 1916.

Application filed November 26, 1915. Serial No. 63,584.

*To all whom it may concern:*

Be it known that I, OTIS V. STEPHENS, a citizen of the United States, residing at Richmond, in the county of Henrico and State of Virginia, have invented certain new and useful Improvements in Dirigible Headlights for Automobiles; and I do hereby declare the following to be a full, clear, and exact description of the invention, such as will enable others skilled in the art to which it appertains to make and use the same.

This invention relates to new and useful improvements in dirigible headlights for vehicles, and one of its objects is the provision of a device of this character, which shall be simple, durable and efficient, and which may be manufactured and sold at a comparatively low cost.

A further object of this invention is the provision of an automatic headlight especially adapted for motor vehicles, having a supporting bracket secured to chassis of an automobile, and provided with a spring for compensating the wear between the bearing carried by the lamp standard and the bracket.

A still further object of this invention is the provision of means for allowing for vertical movement between the lamp standard and the steering mechanism when the automobile is passing over uneven ground.

With these and other objects in view, as will become more apparent as the description proceeds, the invention consists in certain novel features of construction, combination and arrangement of parts, as will be hereinafter more fully described and claimed.

For a complete understanding of my invention, reference is to be had to the following description and accompanying drawing, in which—

Figure 1 is a side elevation partly in section of an automobile equipped with my improved headlight. Fig. 2 is a top plan view showing the connection between the lamp standard and the steering mechanism of an automobile to which my device is applied. Fig. 3 is a fragmental transverse sectional view taken on the line 3—3 of Fig. 1, and Fig. 4 is a detail view of one of the universal joints.

Referring to the drawing, the numeral 1 indicates the chassis of an automobile, 2 the spring, 3 the axle of the well-known stub axle type having wheels 4 mounted thereon and connected together by a connecting rod to which my invention is applied.

Secured to the chassis 1, is the bracket 7, having a housing 8 secured to the outer end thereof, and the housing 8 is provided with a circular opening 9, having flared upper edges 10 and an enlarged opening 11. A plug 12 provided with a circular opening 13 is secured to the lower end of the housing 9 and adapted to receive a lamp standard which will be hereinafter more fully described.

The lamp standard 14 is provided with forked ends 15 to receive an automobile lamp 16 of the ordinary construction. The lamp standard 14 is mounted in the housing 11 and is provided with a bearing 17 adapted to bear upon the flared upper edges 10 of the circular opening 9. The bearing 17 is provided with a vertical flange 18 having an alining opening therein to receive a pin 19 which passes through the lamp standard 14 and holds the bearing against movement thereon. A cap 20 is mounted on the upper end of the housing 9 and holds the pin 19 against accidental movement during its operation. A coil spring 21 is mounted on the lamp standard 14 within the enlarged opening 11 and bears upon the housing 9 and upon the pin 22 carried by said lamp standard 14 to compensate for any wear that may occur between the bearing 17 and the flared edges 10 of the circular opening 9, providing a tension means to the lamp standard within the housing 9 so that said lamp standard will not rattle within the housing when passing over uneven ground. The lamp standard 14 is bent to form an operating arm 23, which extends rearwardly and above the axle 3. A connecting bar 24 is connected to the end of the operating arm 23 by means of a universal joint 25 of the well-known type and the opposite end connected to another operating arm of a lamp standard of the same construction carried by the opposite side of the automobile by a universal joint 26 to move the lamp 16 simultaneously. A connecting link 27 is secured to the operating arm 23 by a universal joint 28 and the opposite end secured to the crank arm 29 of the stub axle 3 by a universal joint 30 providing means for moving the lamps in the direction of the wheels.

From the foregoing description taken in connection with the drawing, it will be understood that when the front wheels 4 are turned, the connecting link 27 will pull the operating rod 23 in the direction of the movement of the crank arm 13 and direct the rays of light in the path of the wheels at all times.

Having thus described my invention, what I claim is:—

1. A dirigible headlight for automobiles comprising a bracket, a housing secured to said bracket and provided with a circular opening having flared upper edges, a lamp standard provided with a bearing thereon mounted in said housing and bearing upon the flared upper edges of the circular opening, a plug slidably mounted on said lamp standard and detachably secured to lower end of the housing, means mounted in said housing for compensating the wear between the bearings and flared edges of the circular openings, and means for rotating said lamp standard in the direction of the wheels.

2. A dirigible headlight for automobiles comprising a bracket, a housing secured to said bracket, said housing provided with a circular opening having flared upper edges thereon, a lamp standard rotatably mounted in said housing, a bearing mounted upon said lamp standard and provided with a vertical flange thereon, a pin adapted to pass through said flange and to the lamp standard to prevent movement of the bearing upon said lamp standard when in engagement with the flared upper edges of the openings, a plug slidably mounted upon the lamp standard and detachably secured to the lower end of the housing, a second pin secured to the lamp standard within said housing, a coil spring mounted on said lamp standard within said housing and adapted to bear upon the upper edge of the housing and upon said second mentioned pin to compensate for the wear between the bearing and the flared upper edge of the circular opening of the housing, and means for rotating the lamp standard in the direction of the wheels.

In testimony whereof I affix my signature in presence of two witnesses.

OTIS V. STEPHENS.

Witnesses:
R. W. HERBERT,
R. F. SANBROUGH.

Copies of this patent may be obtained for five cents each, by addressing the "Commissioner of Patents, Washington, D. C."